United States Patent [19]

Nöhren et al.

[11] Patent Number: 4,592,524
[45] Date of Patent: Jun. 3, 1986

[54] DEVICE FOR THE SEPARATION OF A LOAD FROM A BELT ASSEMBLY

[75] Inventors: Hubert Nöhren, Hamburg; Bruno Stürzenbecher, Norderstedt, both of Fed. Rep. of Germany

[73] Assignee: Autoflug GmbH, Rellingen, Fed. Rep. of Germany

[21] Appl. No.: 587,406

[22] Filed: Mar. 8, 1984

[30] Foreign Application Priority Data

Mar. 8, 1983 [DE] Fed. Rep. of Germany ....... 3308177

[51] Int. Cl.⁴ .............................................. B64D 17/38
[52] U.S. Cl. .............................. 244/151 B; 244/138 R; 294/76
[58] Field of Search ........... 244/151 R, 151 B, 151 A, 244/138 R; 294/76

[56] References Cited

U.S. PATENT DOCUMENTS

| | | | |
|---|---|---|---|
| 1,981,461 | 11/1934 | Miller | 244/151 B |
| 2,371,640 | 3/1945 | Manson et al. | 244/151 B |
| 2,452,990 | 11/1948 | Bush. | |
| 2,662,707 | 12/1953 | Vann. | |
| 3,236,333 | 2/1966 | Mitchell | 244/138 R |
| 3,602,142 | 11/1971 | Bigeon et al. | 244/151 B |
| 3,765,711 | 10/1973 | Hammond | 294/76 |
| 4,333,621 | 1/1982 | Acko | 244/138 R |
| 4,493,240 | 1/1985 | Norton | 244/151 B |

FOREIGN PATENT DOCUMENTS

1142109 1/1963 Fed. Rep. of Germany .

*Primary Examiner*—Galen L. Barefoot
*Attorney, Agent, or Firm*—Prutzman, Kalb, Chilton & Alix

[57] ABSTRACT

A device for the separation of a load from a belt assembly connected to it, especially of a parachute, which on impact with the earth compresses an impact component which is arranged on the impact side of the load and is released by the motion of impact. In order to achieve a safe separation which is free of delay, it will directly deal with the relative movement of the impact component or a mechanically connected part by the operation of the force of impact. The impact component can be developed as a landing shock absorber.

34 Claims, 8 Drawing Figures

DEVICE FOR THE SEPARATION OF A LOAD FROM A BELT ASSEMBLY

BACKGROUND AND SUMMARY OF THE INVENTION

This invention relates to a device for the separation of a load from a belt assembly to which it is attached and particularly to the release of a load suspended from a parachute on impact with the ground. More specifically, the present invention is directed to apparatus for releasably coupling a load to straps by which it is suspended, the coupling mechanism including an impact component which is affixed to the load on the side of expected impact, the coupling mechanism being operated by the movement of at least a part of the impact component relative to the load in response to an impact such as will occur when a load suspended from a parachute strikes the ground.

Published Federal Republic of Germany patent application DE-AS No. 19 48 543, discloses a prior type of release coupling for use between a load and a parachute, this prior coupling being provided with a pyrotechnic separation device which is detonated in response to the forces produced when the load strikes the ground. This type of releasable coupling device has the disadvantages that it is expensive and likely to malfunction both because of the reliance upon an auxiliary energy source for operation and because of the relatively large number of components disposed between the member which receives the impact and the separating coupling. Pyrotechnic separation devices further have the disadvantages of susceptibility to destruction, for example a premature detonation, and the fact that there is a delay between impact and operation of the release mechanism.

Releasable coupling mechanisms for suspended loads are also known which do not require use of auxiliary energy and on landing of the load operate in response to deceleration thereof or a reduction in the force acting on the coupling mechanism. Devices of these types are disclosed in Federal Republic of Germany Published patent application Nos. DE-AS 1 226 884, DE-OS 29 49 452, DE-AS 25 03 936, DE-OS 25 52 935, DE-OS 28 34 435. In order that such couplings are not unintentionally released in response to dynamic forces occurring during descent, they must have a high control threshold or suitable safety components which delay the operation of the coupling mechanism to thus prevent premature release of the load in response to transient conditions. These types of coupling mechanisms have the disadvantage that they are located at the upper part of the load so that during the launch or landing the releasable coupling mechanism can fall on the load and damage it. Finally, such coupling mechanisms have the disadvantage that, after the release of the separation coupling, most or some of the belt assembly remains connected to the load and can damage it.

The general object of the present invention is to provide a coupling mechanism particularly well-suited for joining a parachute assembly to a suspended load which is operable without delay and which, on landing, safely and reliably releases the belt assembly by which the parachute is connected to the load, especially on a hard landing.

According to the present invention, the releasable coupling mechanism is designed such that the belt assembly is directly released in response to movement, caused by the force of impact, of at least a part of an impact component relative to another component of the coupling mechanism which is affixed to the load.

The direct utilization of the force of impact eliminates the need for a source of auxiliary energy and also the need to take into account variations in the force applied to the releasable coupling mechanism during descent. The operation of the present invention is such that any frictional losses occurring in the coupling mechanism will be overcome by the forces produced upon impact of the impact component with the ground.

According to the present invention, the releasable coupling mechanism is comparatively inexpensive, this being particularly true when it is recognized that the impact component serves the dual function of a landing shock absorber. The required motion of the impact component relative to the load as the impact component performs the shock absorbing function may thus be used as separating motion for the union of the load with the belt material assembly by which the load is connected to the parachute assembly.

Since the load may arrive at the ground in a slanting position, the impact component is constructed so as to define a plate which functions as an extended edge of the load upon which impact will occur. This plate-like impact receiving member is mounted such that the required motion of the impact component with respect to the load will occur regardless of the point on the edge of the load where contact is first made with the ground.

According to the invention, the connection of the load to the belts or straps by which the load is suspended from the parachute is implemented by the interconnection of plural belt ends. This permits the coupling of the belt assembly to the load solely by external binding of the load and without the need for a binding component or the like which supports the full weight of the load. The interconnection of the belt ends is easy to implement and to break. The interconnection technique of the present invention has the desirable attribute of allowing the impact component to be located in close proximity to the point or region of interconnection of the belt ends and this, in turn, permits the means by which force and motion is transferred to the mechanism by which the interconnection is broken to be of uncomplicated construction.

According to the invention, the interconnection of the belt ends is preferably defined by a destructible connecting link. In an advantageous specific embodiment, this connecting link cooperates with a separating or disrupting mechanism in the form of a knife which moves in response to movement of all or part of the impact component. As an alternative, the connecting link is comprised of a material which fractures upon transferral of the impact force from the impact component. For example, the connecting link can consist of a connecting ring which cooperates with the belt ends and which is comprised of brittle material such as glass which, when subjected to sufficient stress or force, will shatter so that the belt ends are freed.

According to another embodiment of the invention a connecting link, for example a pin, which is displaceable by the force of impact out of a location where it engages loop extensions of the belt ends to a location in which the belt ends are released from one another. In this arrangement the impact induced displacement of the separating connection or member, which displacement is in a direction which is generally transverse to the ends of the belts to be released, permits the connecting link(s) to be pulled free of the belts.

According to an important feature of the invention, the connecting link for the belt ends may comprise a single easily destructible member and thus the decoupling or belt end separating function may be performed as a single step. Accordingly, the collected belt ends may be simultaneously detached in a single procedure.

An example of an embodiment which implements such a single step function release has a cord which connects the collective belt ends and on impact is separated by at least a cut. The connecting link may be generally star-shaped and defined by a cord which intersects itself in a central region and in this embodiment the knife is ring-shaped and located adjacent the region of the intersection of the rope. The proper location of the ropes inside of the region circumscribed by the knife is obtained by rigidly connected guide parts for the cord and the knife on that portion of the coupling mechanism which is affixed to the load.

The single step release operation is also implemented by the displacable connecting link embodiment which employs a retaining finger which extends through several connecting belt ends or loop-like extensions thereof. On impact the retaining finger, which is resiliently biased to the belt end engaging position, is caused to be retracted whereupon the retaining finger is withdrawn from the belt ends.

In the present invention the belt-end separating arrangement is concentric to the generally plate-shaped impact component and the impact component is fastened to the load in such a way that upon impact at least a portion of an edge region thereof approaches the load to thereby actuating the separating mechanism. This motion of the impact component as a result of the stressing of a point on its edge is permitted by supporting the impact component on its edge by a retaining arrangement which can be compressed, will not resume its initial shape and is not removeable from the load. On impact at a point on its edge, at least a portion of the impact component in the region of the point of impact is deformed and is able to approach the load, while the radial point located opposite to the point of impact may not be moved relative to the load due to the unremoveable support of the impact component on the load. The middle part of the impact component, which is directly coupled to the separating mechanism, also approaches the load as a result of the impact induced distortion of the edge region of the impact component. It has been found desirable for the impact component, at its edge to have a distance of movement of more than double the movement of the part thereof which will cause actuation of the separating mechanism. Accordingly, the distance of movement of the impact component in the middle required for the operation of the separating mechanism will be less than the maximum distance of movement of an edge region deformed as it acts as a shock absorber. The unremoveable connection between the impact component and load can be effected according to the invention by a number of bolts distributed over the circumference thereof which are provided with flexible counter pressure devices, for example pressure springs or workable synthetic casings or a circumferential bracket of deformable material such as sheet metal or synthetics which extend between the impact component and load. The counter pressure device or devices will be selected with regard to energy consumption when the coupling mechanism function as a landing shock absorber.

Compression springs may be provided on the belts or on rope loop extensions of the belt ends, such springs being stretched in the impacted condition to pull the released belts out of the connecting area in order to allow the freeing of the load from the belt assembly.

So that the belt ends cannot be trapped between the plate-shaped impact component and the load, the belt ends are advantageously positioned in protected belt guides. These belt guides may, for example, take the form of grooves formed on the bottom surface of the load or defined by projections extending from the surface of the load.

BRIEF DESCRIPTION OF THE DRAWINGS

Further advantageous features of the invention will become apparent from the following description of the preferred examples with the aid of the drawings and wherein.

DESCRIPTION OF THE PREFERRED EMBODIMENT

Figure 1:
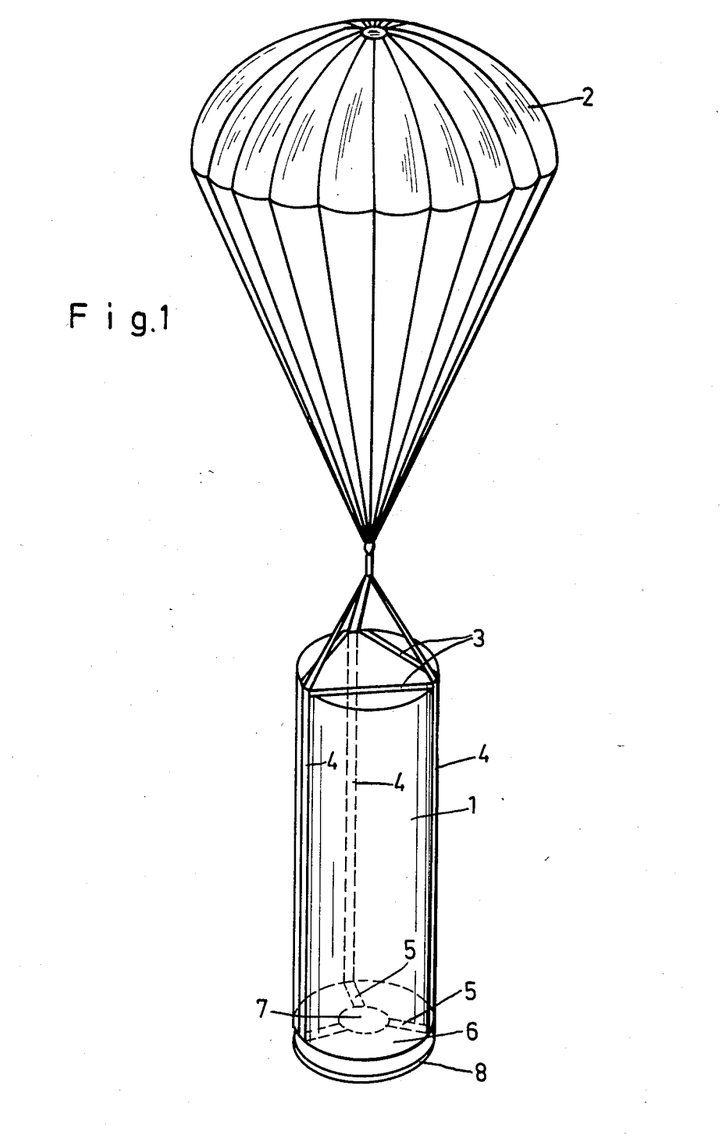
FIG. 1—a perspective view of a load including a coupling mechanism in accordance with the present invention suspended from a parachute, FIG. 2—a partial view depicting the impact of the end of on landing, FIG. 3—a bottom plan view of the load and coupling mechanism of FIG. 1 with the impact plate removed, FIG. 4—a cross-sectional view taken along the parting line indicated in FIG. 3, FIG. 4 also showing the impact plate of the coupling mechanism, FIG. 5—a view corresponding to FIG. 3 of a second embodiment, FIG. 6—a view corresponding to FIG. 3 of a third embodiment, FIG. 7—a cross-sectional view taken along the parting line indicated in FIG. 6, and FIG. 8—a side view, party broken away, showing apparatus in accordance with a fourth embodiment.
Figure 2:
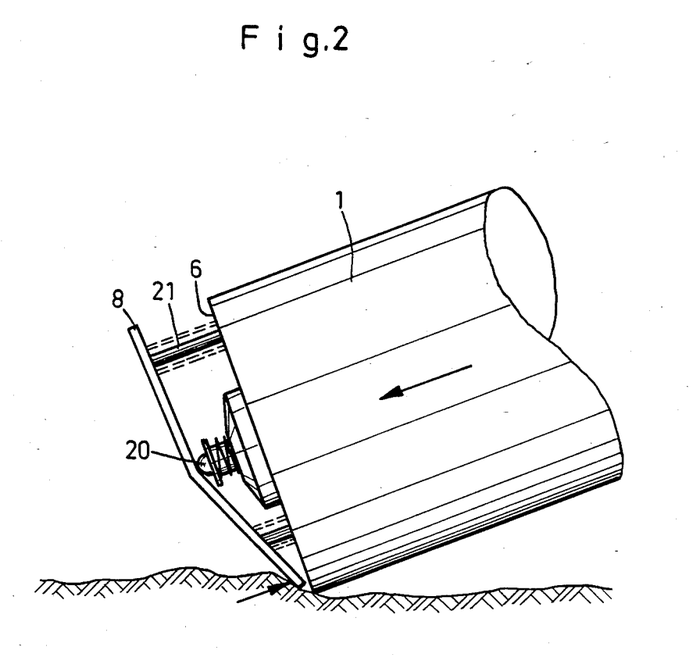

Referring to FIG. 1, the load 1 is shown as an elongated cylindrical body. Load 1 is suspended from a parachute 2 by a belt assembly having three longitudinal belts 4 which are coupled together at the top of the load 1 by a further belt 3. The ends 5 of belts 4 are provided with loops. Belt ends 5 are connected together on the lower front surface 6 of the load 1 by a connecting component or coupling mechanism 7 so that the load is retained between the belt parts 3, 4 and 5. If the connection of the belt ends 5 established by connecting component 7 is broken the load 1 falls free from the belt assembly. An impact component in the form of impact plate 8 is attached to the load and spaced from the lower front surface 6 thereof. The parachute 2 is dimensioned with respect to the size of the load so that the load is stabilized after being dropped and arrives safely on the ground with its lower end (i.e. the impact plate 8) first, as shown in FIG. 2. As indicated by the force arrows in FIG. 2, the side of the impact plate 8 is bent upward by the impact of the edge of the impact plate 8 with the ground. Thus, the impact plate 8 is deformed by absorbing the shock of the landing impact. Understandably, there is allowance for greater landing angles. Moreover, the invention is operable in the case where the load is stabilized by the parachute in such a way that it hits the ground with the edge of its lower front surface or impact plate at considerable horizontal speed.

Figure 4:
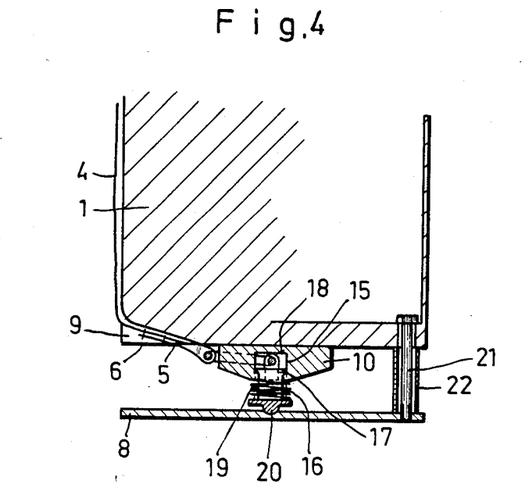

As shown in FIG. 4, the ends 5 of the belts 4 are guided in groove-like recesses 9 in the area of the lower front surface 6 of the load 1 so that the ends 5 are not jammed between the impact plate 8 and the lower front surface 6 upon distortion of the impact plate 8 as shown in FIG. 2 and therefore the ends 5 may easily slip away from each other upon disconnection.

Figure 3:
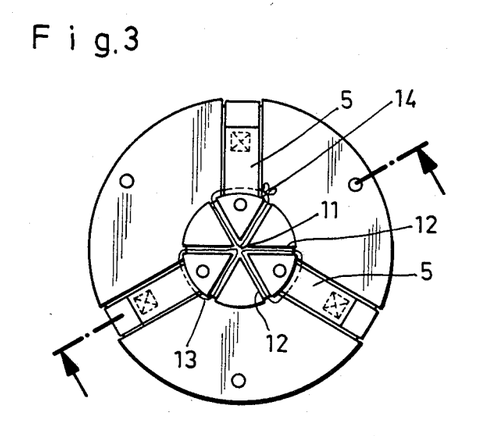

The releasable coupling mechanism 7 is located at the middle of the lower front surface 6 of the load 1, the coupling mechanism providing for the connection and separation of the belt ends 5 with one another respectively. The mechanism 7 includes a body 10 which is centrally disposed and securely mounted to the front surface 6. Body 10 defines three pairs of guide grooves 12 which have center lines angularly spaced at about 120 degrees. Grooves 12 extend radially from an intersection point 11 located within a centrally located circular recess. As shown in FIG. 3, the center line of each pair of grooves 12 is aligned with one of the groove shaped recesses 9 which receives a belt end 5. A cord 13 is passed through all the loop-like belt ends 5 and fed along the grooves 12 as shown in FIG. 3. Since the cord 13 is positioned in opposite aligned grooves 12, the lengths of the cord intersect in a central region of body 10 of coupling mechanism 7. The ends of cord 13 are secured together by a knot 14 or the like.

The region of intersection 11 is defined by a central recess in body 10 which is limited laterally by a straight side wall or walls 15. The walls 15 form a guide for a cylindrical knife body 16 with a ring-shaped cutting edge 17, cutting edge 17 facing inwardly towards the base 18 of the recess and the intersecting lengths of cord 13. The knife body 16 is biased away from the base 18 of the recess by a compression spring 19 so that its cutting edge 17 is in a state of rest at a safe distance from the cord 13. The knife body 16 is supported, at the end disposed oppositely with respect to its cutting edge 17, by a cap member which defines a capping point 20. Capping point 20 is coaxial with the cylindrical knife body 16 and is defined by a projection which contacts the impact plate 8. Besides the spring 19, an additional force can be provided to prevent the knife body when in a resting state from approaching the cord 13 as, for example, in the form of a graduated narrowing of the wall 15.

As shown in FIG. 4, the impact plate 8 is mounted on three bolts 21 which are generally spaced about the perimeter of the impact plate. The bolts 21 are surrounded by deformable protective plastic casings 22. The bolts 21 thus define the resting place of the knife body 16.

Since the plastic casings 22 are deformable in response to an applied compressive force, the edges of the impact plate 8 affected directly by an impact with the ground can be distorted as represented in FIG. 2. Any impact which produces movement or distortion of the landing shock absorber will cause the central portion of the plate 8 to drive the knife body 16 inwardly such that, upon impact of the edge of the plate 8 with the ground, the plate 8 presses the knife body 16 into the guide 10 so that the cutting edge 17 strikes through the overlying lengths of the cord 13. In order to ensure a safe cut, the guide 10, or at least the bottom surface of the base 18 of recess 11 thereof opposite the cutting edge 17, consists of soft material such as plastic or light metal so that the cutting edge can penetrate when cutting in order to separate the last thread of the cord 13 with certainty. When the cord 13 is cut the belt ends 5 fall free from one another and the parachute will be released from the load on the moment of impact and without any delay.

The cap 20 of the knife body is, when the cord cutting stroke is complete, at a predetermined distance from the lower front surface 6 of the load 1 which is more than half the distance of the impact plate 8 from the load front surface 6 in its original or resting place. Therefore, as disclosed in FIG. 2, the bending of the plate upon impact absorbs the forces produced whereupon the releasable coupling mechanism of the present invention may also function as a landing shock absorber for the load 1. The above-described embodiment of the invention has the further advantage that the compressing force for moving the knife body and cutting the rope can easily be calculated and determined to insure an adequate amount of force even under the most unfavorable conditions.

The above-described device for separating the connecting belt ends 5 is centrally disposed between the impact plate 8 and the lower front surface 6 of the load and such positioning has the advantage that the separating device can be made very small and very uncomplicated and that the risk of error in the transferral of energy is minimal. The further embodiments of the invention hereinafter described also have this advantage.

Figure 5:
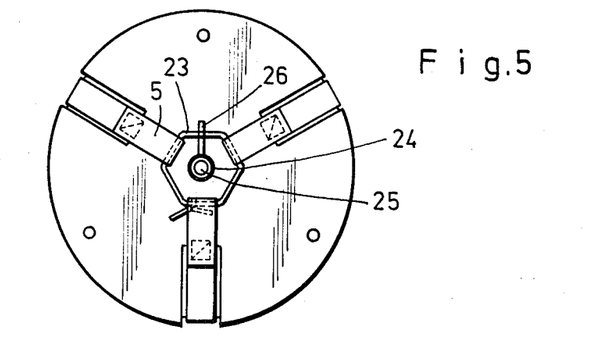

Referring to FIG. 5, an alternate embodiment of the invention is shown wherein the cord 23 which connects the belt ends 5 takes the form of a continuous, non-circular loop and the knife body, which is developed as a guide pin 25 disposed in an axial bore 24, holds one (or more) radially extending blades 26 which preferably travel in guide slots. The operation of this embodiment is essentially the same as that of the embodiment of FIGS. 3 and 4.

Figure 6:
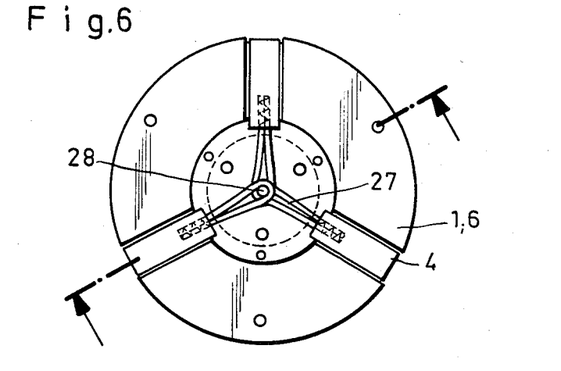
Figure 7:
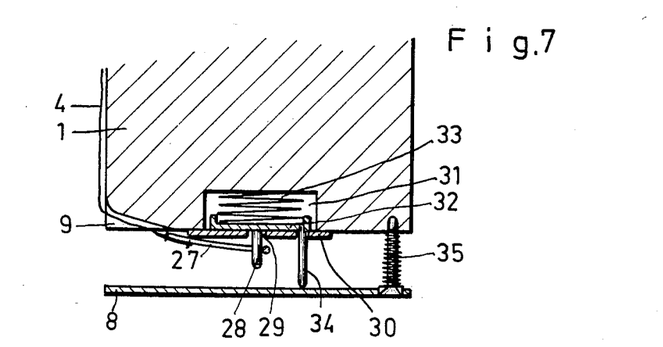

Referring to FIGS. 6 and 7, a further embodiment is shown wherein loops 27 formed from rope or cord are affixed to and define extension of the belt ends. The loops 27 may be comprised of elastic material, by springs or may include springs. A support finger 28 passes through all of the loops 27. The forces applied to the loops, by the belts are adjusted to be substantially equal. Accordingly, the support finger 28 is required only to transfer force from loop to loop and not from the belts to the load. The support finger 28 extends axially through a bore 29 in a cover 30 which extends over a recess 31 and is secured to a support plate 32 within the recess 31. The support plate 32 is biased outwardly by the force of a compression spring 33 as shown in FIG. 7 so that the support finger 28 extends beyond the outer surface of the cover 30 as far as possible. A plurality of actuator pins 34 are affixed to support plate 32 and extend outwardly through apertures in cover 30. Pins 34 are evenly spaced about the periphery of plate 32 and extend approximately to the impact plate 8. The position of plate 8 is defined by a plurality of mounting bolts. Each of the mounting bolts is encircled by a compression spring 35, the springs urging plate 8 outwardly.

In the manner described above in the discussion of FIG. 2, if the impact plate 8 is deformed on the landing of the load, at least one of the pins 34 will be forced upwardly thus causing support plate 32 to move against the bias of spring 33 toward the bottom of recess 31. Accordingly, the loop retaining support finger 28 will be withdrawn into the recess 31 through the bore 29. As the rope loops 27 are not able to follow the loop retaining support finger 28, the loops 27 are released whereupon the parachute and belts are freed from the load.

As an alternative construction, three support fingers may be distributed nonconcentrically and in the form of an angle on the support plate 32, namely one for each loop.

If deemed necessary, provision can be made to prevent or delay the return of the loop retaining support finger 28 to the locking position thereby ensuring that the loops 27 will always be moved away out of the center of the cover 30 before the support finger 28 re-emerges from the bore 29. Such provision is not required in the described device in general since the support plate 32 assumes a non-parallel relationship to impact plate 8 upon impact because one or at the most two pins 34 will be pushed upwardly upon an impact. Accordingly, as soon as the support finger 28 is withdrawn to the inside of cover 30 through the bore 29 the plate 32 will be displaced diagonally and the support finger will no longer be aligned with the bore 29 and cannot return to the locking position.

Figure 8:
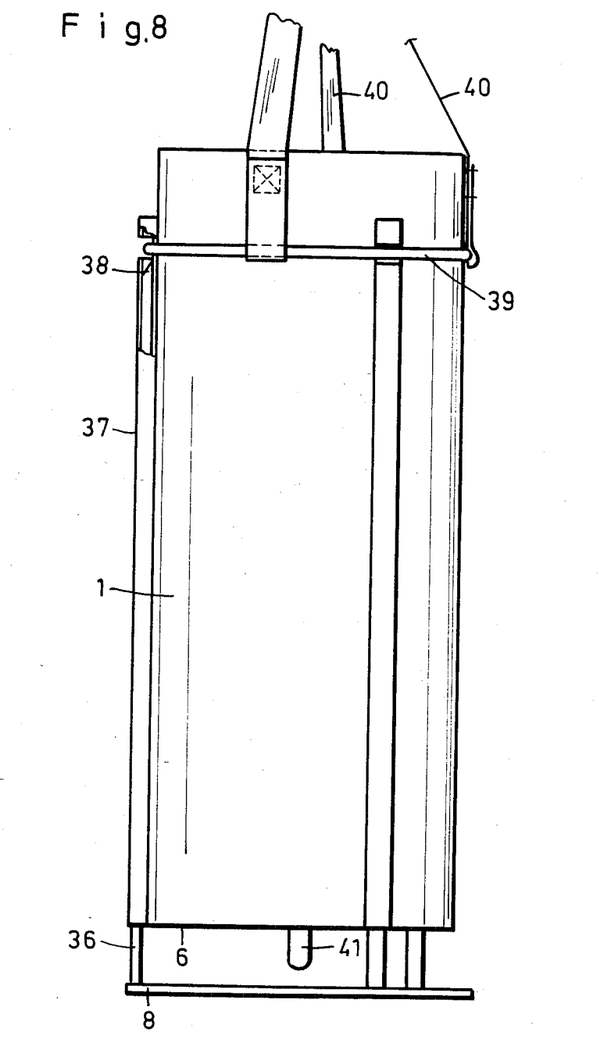

Referring to a still further embodiment in FIG. 8, the impact plate 8 is supported from three long plungers 36 movably mounted within a cover 37 which is concentric with the load 1. The plungers 36 are guided for movement in a longitudinal direction and define, if necessary with the use of bias springs as shown in FIG. 7, the stable or "rest" position of the impact plate 8. On the upper end of each plunger 36, a cutting edge 38 is provided. A securing cord 39 is tied about the circumference of load 1. Securing cord 39 passes through the loops formed on the ends of belts 40 which are connected to the parachute lines. Cord 39 is positioned, by suitable supports, immediately above the cutting edges 38. On landing, the load is shifted by the force of impact at least to one of the plungers 36, whereby the cutting edge 38 runs through the area of the support in which the cord 39 is located so that the cord 39 is severed. In order to limit the cord cutting stroke, and also to employ the deformation of impact plate 8 to absorb landing shock, a stop 41 can be provided on the central lower front surface 6 of the load 1.

The above-description of the impact component 8 as a plate should not be construed as limited to being a disc shaped member. To the contrary, component 8 may have an irregular shape such as, for example, a star or may be in the form of a ring, a cap or the like.

Where an embodiment of the invention is indicated as having a destructible connecting link for connecting the belt ends, i.e., a severable cord or the like, it is preferable that a separate element of the belt ends be provided although, alternately, the belt ends which are not yet in an uninterrupted separated condition (for example as a traversing belt) may proceed into one another and then take on the character of the belt ends. Before separation, there can be no outward differentiation between belt, belt end and connecting link.

What is claimed is:

1. A coupling device for detachably connecting a load to a suspension system, the suspension system including plural belts which define a receptacle for the load, the load having an upper end and a lower end, said coupling device comprising:
    an impact member, said impact member having a configuration which defines an impact reception area which is at least generally commensurate in size with the lower end of the suspended load, said impact member being capable of distortion in response to an impact thereon;
    means for supporting said impact member from the load, said supporting means defining an initial spacing of said impact member from the load, said supporting means engaging said impact member in a plurality of spacially separated locations adjacent the periphery of said impact member;
    means for interconnecting the first ends of a plurality of the suspension system belts, said interconnecting means being mounted on the load;
    movable release means for cooperation with said interconnecting means to terminate the interconnection of the first belt ends, said release means having a first inoperative position and a second position where it produces termination of the belt end interconnection; and
    means directly mechanically connecting said release means to said impact member whereby impact induced movement of any part of said impact member toward the load will produce movement of said release member from the first to the second position.

2. The coupling device of claim 1 wherein the suspension system includes a parachute coupled to the second ends of the belts.

3. The coupling device of claim 1 wherein the load and suspension on system define an axis and wherein said impact member defines a plane, said supporting means orienting said plane generally transverse to said axis.

4. The coupling device of claim 1 further comprising:
    means for resiliently biasing said release means toward said first position.

5. The coupling device of claim 2 wherein the load and suspension system define an axis and wherein said impact member defines a plane, said supporting means orienting said plane generally transverse to said axis.

6. The coupling device of claim 5 further comprising:
    means for resiliently biasing said release means toward said first position.

7. The coupling device of claim 1 wherein said interconnecting means comprises a destructible link, and wherein said release means includes at least a first mechanical element for directly contacting and destroying said link.

8. The coupling device of claim 7 wherein the belt first ends include loops, said destructible link comprises a severable cord which engages the loops, and said first mechanical element includes a cutting edge.

9. The coupling device of claim 7 wherein said interconnecting means further comprises:
    means defining guide grooves which receive the belt first ends, said guide grooves opening toward said impact member whereby distortion of said impact member cannot result in contact between said impact member and a suspension system belt.

10. The coupling device of claim 9 wherein said interconnecting means additionally comprises:
    a housing member centrally located on the lower end of the load, said guide grooves terminating at first ends adjacent said housing member, said housing member defining a path for said destructible link, the path of movement of said mechanical element intersecting said destructible link path.

11. The coupling device of claim 10 wherein the belt first ends include loops, said destructible link comprises a severable cord which engages the loops, and said first mechanical element includes a cutting edge.

12. The coupling device of claim 11 wherein said path for said cord includes a circular recess which is generally coaxial with the load and a plurality of radial slots which communicate with said recess, and wherein said mechanical element comprises an annular knife which moves in said recess.

13. The coupling device of claim 1 wherein said interconnecting means comprises:
   means defining guide grooves which receive the belt first ends, said guide grooves opening toward said impact member whereby distortion of said impact member cannot result in contact between said impact member and a suspension system belt.

14. The coupling device of claim 1 wherein the belt first ends include loop extensions and wherein said release means comprises a retractable pin which engages said loop extensions.

15. The coupling device of claim 13 where first ends include loop extensions and wherein said release means comprises a retractable pin which engages said loop extensions.

16. The coupling device of claim 14 further comprising:
   means for resiliently biasing said release means toward said first position.

17. The coupling device of claim 15 further comprising:
   means for resiliently biasing said release means toward said first position.

18. The coupling device of claim 17 wherein said release means further comprises:
   means defining a recess at the lower end of the load;
   an apertured cover which extends over said recess; and
   a movable plate disposed in said recess, said pin being affixed to said plate and extending through an aperture in said cover.

19. The coupling device of claim 18 wherein the suspension system includes a parachute coupled to the second ends of the belts.

20. The coupling device of claim 19 wherein the load and suspension system define an axis and wherein said impact member defines a plane, said supporting means orienting said plane generally transverse to said axis.

21. The coupling device of claim 7 wherein the load and suspension system define an axis and wherein said impact member defines a plane, said supporting means orienting said plane generally transverse to said axis.

22. The coupling device of claim 21 wherein the belt first ends include loops, said destructible link comprises a severable cord which engages the loops, and said first mechanical element includes a cutting edge.

23. The coupling device of claim 12 wherein the load and suspension system define an axis and wherein said impact member defines a plane, said supporting means orienting said plane generally transverse to said axis.

24. The coupling device of claim 11 wherein said supporting means comprises a plurality of compressible members, said members being in an uncompressed state prior to an impact on said impact member and remaining in the compressed state subsequent to an impact.

25. The coupling device of claim 24 wherein said compressible members each comprise shock absorber means.

26. The coupling device of claim 25 wherein said shock absorber members each comprise a bolt and a deformable member surrounding said bolt, said deformable members extending between the load and said impact member.

27. The coupling device of claim 14 wherein said belt first end loop extensions are elastic.

28. The coupling device of claim 10 wherein said plane defined by said impact member is spaced from the load at the most radially outwardly disposed points of said impact member by a distance which is more than twice the spacing between the center of said impact member and said housing member.

29. The coupling device of claim 1 further comprising:
   strap means for interconnecting the suspension system belts at the upper end of the load.

30. The coupling device of claim 7 wherein said supporting means and means connecting said release means to said impact member comprise elongated plungers and wherein said release means includes a knife edge on the upper end of each of said plungers, said knife edges contacting said interconnecting means in the sccond position thereof.

31. The coupling device of claim 30 wherein said destructible link comprises a severable cord and wherein said belt first ends include loops which are engaged by said cord.

32. The coupling device of claim 25 wherein said interconnecting means comprises a destructible link, and wherein said release means includes at least a first mechanical element for directly contacting and destroying said link.

33. The coupling device of claim 32 wherein the load and suspension system define an axis and wherein said impact member defines a plane, said supporting means orienting said plane generally transverse to said axis.

34. The coupling device of claim 33 wherein said interconnecting means further comprises:
   means defining guide grooves which receive the belt first ends, said guide grooves opening toward said impact member whereby distortion of said impact member cannot result in contact between said impact member and a suspension system belt.

* * * * *

UNITED STATES PATENT AND TRADEMARK OFFICE
CERTIFICATE OF CORRECTION

PATENT NO. : 4,592,524
DATED : June 3, 1986
INVENTOR(S) : Hubert Nohren et al

It is certified that error appears in the above-identified patent and that said Letters Patent are hereby corrected as shown below:

Column 8, line 29, delete "on".

Column 10, line 3, delete "11" and substitute --1--.

Signed and Sealed this

Seventeenth Day of February, 1987

Attest:

DONALD J. QUIGG

Attesting Officer

Commissioner of Patents and Trademarks